(12) United States Patent
Richards et al.

(10) Patent No.: US 10,865,003 B2
(45) Date of Patent: Dec. 15, 2020

(54) FOOD PRODUCT HANDLING DEVICE, SYSTEM, AND RELATED METHODS

(71) Applicant: F.R. Drake Company, Waynesboro, VA (US)

(72) Inventors: Andre Richards, Charlottesville, VA (US); Thomas Ivy, Smithfield, VA (US); Keith W. Hopkins, Waynesboro, VA (US); George E. Reed, Waynesboro, VA (US)

(73) Assignee: F.R. Drake Company, Waynesboro, VA (US)

( * ) Notice: Subject to any disclaimer, the term of this patent is extended or adjusted under 35 U.S.C. 154(b) by 124 days.

(21) Appl. No.: 16/278,921

(22) Filed: Feb. 19, 2019

(65) Prior Publication Data
US 2019/0177015 A1 Jun. 13, 2019

Related U.S. Application Data

(62) Division of application No. 14/298,495, filed on Jun. 6, 2014, now Pat. No. 10,207,830.

(Continued)

(51) Int. Cl.
| | |
|---|---|
| *B65B 5/08* | (2006.01) |
| *B65B 35/38* | (2006.01) |
| *B65B 35/44* | (2006.01) |
| *B25J 11/00* | (2006.01) |
| *B25J 15/00* | (2006.01) |
| *B65B 19/34* | (2006.01) |
| *B65B 9/04* | (2006.01) |

(Continued)

(52) U.S. Cl.
CPC ............ *B65B 5/08* (2013.01); *B25J 11/0045* (2013.01); *B25J 15/0061* (2013.01); *B25J 15/0616* (2013.01); *B65B 5/06* (2013.01); *B65B 9/04* (2013.01); *B65B 19/34* (2013.01); *B65B 25/065* (2013.01); *B65B 35/38* (2013.01); *B65B 35/44* (2013.01); *B65G 47/918* (2013.01)

(58) Field of Classification Search
CPC ... B25J 11/0045; B25J 15/0616; B65B 35/38; B65G 47/918
USPC .......................................................... 53/473
See application file for complete search history.

(56) References Cited

U.S. PATENT DOCUMENTS

| | | |
|---|---|---|
| 3,013,833 A | 12/1961 | Gwin et al. |
| 3,077,993 A | 2/1963 | Mulvany et al. |
| (Continued) | | |

FOREIGN PATENT DOCUMENTS

| | | |
|---|---|---|
| EP | 0644120 A1 | 3/1995 |
| EP | 2463065 A1 | 6/2012 |
| FR | 2663903 A1 | 1/1992 |

*Primary Examiner* — Chelsea E Stinson
(74) *Attorney, Agent, or Firm* — Berenato & White, LLC (57) ABSTRACT

A food product handling device is provided. The food product handling device can include a movable loading head having a plurality of rails and a vacuum system operatively associated with the head. In addition, a plurality of suction devices carried by the head and configured to pick up and transport a food product as the head is moved can be provided. A plurality of mounting blocks can be slidably coupled to the rails where at least one suction device is coupled to each mounting block. An actuating device can be operatively associated with the mounting blocks such that each mounting block is configured to slide between a first position and a second position.

13 Claims, 9 Drawing Sheets

Related U.S. Application Data (60) Provisional application No. 61/832,543, filed on Jun. 7, 2013, provisional application No. 61/898,559, filed on Nov. 1, 2013.

(51) Int. Cl.
*B25J 15/06* (2006.01)
*B65B 25/06* (2006.01)
*B65B 5/06* (2006.01)
*B65G 47/91* (2006.01)

(56) References Cited

U.S. PATENT DOCUMENTS

| | | |
|---|---|---|
| 3,920,128 A | 11/1975 | Baker |
| 3,928,942 A | 12/1975 | Paddock et al. |
| 3,929,234 A | 12/1975 | Warren |
| 3,934,916 A * | 1/1976 | Baker ............... A21B 3/18 294/189 |
| 4,557,514 A | 12/1985 | Cushman et al. |
| 4,763,941 A | 8/1988 | Sniderman |
| 4,832,180 A | 5/1989 | Ferrero |
| 5,110,239 A | 5/1992 | Riley et al. |
| 5,605,031 A | 2/1997 | Prakken |
| 5,931,279 A | 8/1999 | Pedrotto et al. |
| 5,943,842 A | 8/1999 | De Koning et al. |
| 6,003,286 A | 12/1999 | Goodman |
| 6,209,293 B1 | 4/2001 | Powers |
| 6,318,777 B1 | 11/2001 | Tanaka et al. |
| 6,352,402 B1 | 3/2002 | Hwang et al. |
| 6,439,631 B1 | 8/2002 | Kress |
| 7,690,706 B2 | 4/2010 | Wild et al. |
| 8,136,802 B2 | 3/2012 | Cho |
| 8,528,718 B2 | 9/2013 | Reed |
| 10,207,830 B2 | 2/2019 | Richards |
| 2004/0094979 A1 | 5/2004 | Damhuis |
| 2005/0028495 A1 | 2/2005 | Blanc |
| 2007/0044429 A1 | 3/2007 | Davi |
| 2008/0031717 A1 | 2/2008 | Wild et al. |
| 2011/0166704 A1 | 7/2011 | Hashimoto |

\* cited by examiner

FOOD PRODUCT HANDLING DEVICE, SYSTEM, AND RELATED METHODS

This application is a continuation of application Ser. No. 14/298,495, filed Jun. 6, 2014, now U.S. Pat. No. 10,207,830, issued Feb. 19, 2019, which claims priority to provisional application Ser. No. 61/832,543, filed on Jun. 7, 2013, and provisional application Ser. No. 61/898,559, filed on Nov. 1, 2013, the disclosures of which are incorporated herein by reference and to which priority is claimed.

FIELD OF THE INVENTION

The present invention relates to food handling machinery, and more particularly to a robotic tool and method for sorting and organizing food products during packaging. In particular, the invention is directed to a loader head used to place tubular food products such as sausages and hot dogs, into packaging for those products.

BACKGROUND OF THE INVENTION

Food products can be packaged individually or in groups. When food products are packaged in groups each individual food product needs to be sorted, organized, and transferred prior to packaging. Conventionally, one machine is used to sort the food product, another machine is used to organize the food product, and still another machine is used to transport the sorted and organized food products to a packaging device. Alternatively, each food product can be individually transported to the packaging device until the predetermined number of food products within the group are provided to the packaging device. However, these methods undesirably increase packaging time and require numerous machines to perform the process.

Therefore, a need exists for food handling machinery and methods that improve upon prior food handling machinery and methods and solves problems inherent in known food handling machinery and methods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to a first aspect of the invention, a food product handling device is provided. The food product handling device can include a movable loading head having a plurality of rails and a vacuum system operatively associated with the head. In addition, a plurality of suction devices carried by the head and configured to pick up and transport a food product as the head is moved can be provided. A plurality of mounting blocks can be slidably coupled to the rails where at least one suction device is coupled to each mounting block. An actuating device can be operatively associated with the mounting blocks such that each mounting block is configured to slide between a first position and a second position.

According to a second aspect of the invention, a food product system can be provided. The food product system can include a product supply device configured to receive a food product and a conveyor system configured to receive the food product from the product supply device. A food product handling device can be configured to pick up and transport a plurality of food products from the product supply device to a food product receiving device. The food product handling device can include a movable loading head having a plurality of rails, a vacuum system operatively associated with the head, a plurality of suction devices carried by the head and configured to pick up and transport the plurality of food products as the head is moved where each suction device is coupled to the vacuum system, a plurality of mounting blocks slidably coupled to the rails, where at least one suction device is coupled to each mounting block, and an actuating device operatively associated with the mounting blocks such that each mounting block is configured to slide between a first position associated with the conveyor system and a second position associated with the food product receiving device.

According to a third aspect of the invention, a method of handling food product is provided. The method can include the steps of providing a plurality of food products and aligning a food product handling device above the plurality of food products. The food product handling device can include a movable loading head having a plurality of rails, a vacuum system operatively associated with the head, a plurality of suction devices carried by the head and configured to pick up and transport food products as the head is moved where each suction device is coupled to the vacuum system, a plurality of mounting blocks slidably coupled to the rails where one suction device is coupled to one mounting block and an actuating device operatively associated with the mounting blocks such that each mounting block is configured to slide between a first position and a second position. The method can further include the steps of applying a vacuum to each suction device of the food product handling device and thereby engaging a food product with each suction device when the mounting blocks are in a first position. The mounting blocks can be actuated to the second position using the actuating device and the food products can be deposited into packaging material by ceasing application of the vacuum at each suction device.

Other aspects of the invention, including apparatus, devices, systems, converters, processes, and the like which constitute part of the invention, will become more apparent upon reading the following detailed description of the exemplary embodiments.

BRIEF DESCRIPTION OF THE DRAWINGS

The food product robot tool and methods associated therewith are described with reference to the following figures. These same numbers are used throughout the figures to reference like figures and components.

DETAILED DESCRIPTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

In the present description, certain terms have been used for brevity, clearness and understanding. No unnecessary limitations are to be inferred therefrom beyond the requirement of the prior art because such terms are used for descriptive purposes only and are intended to be broadly construed. The different apparatus and methods described herein may be used alone or in combination with other systems and methods.

Figure 1:
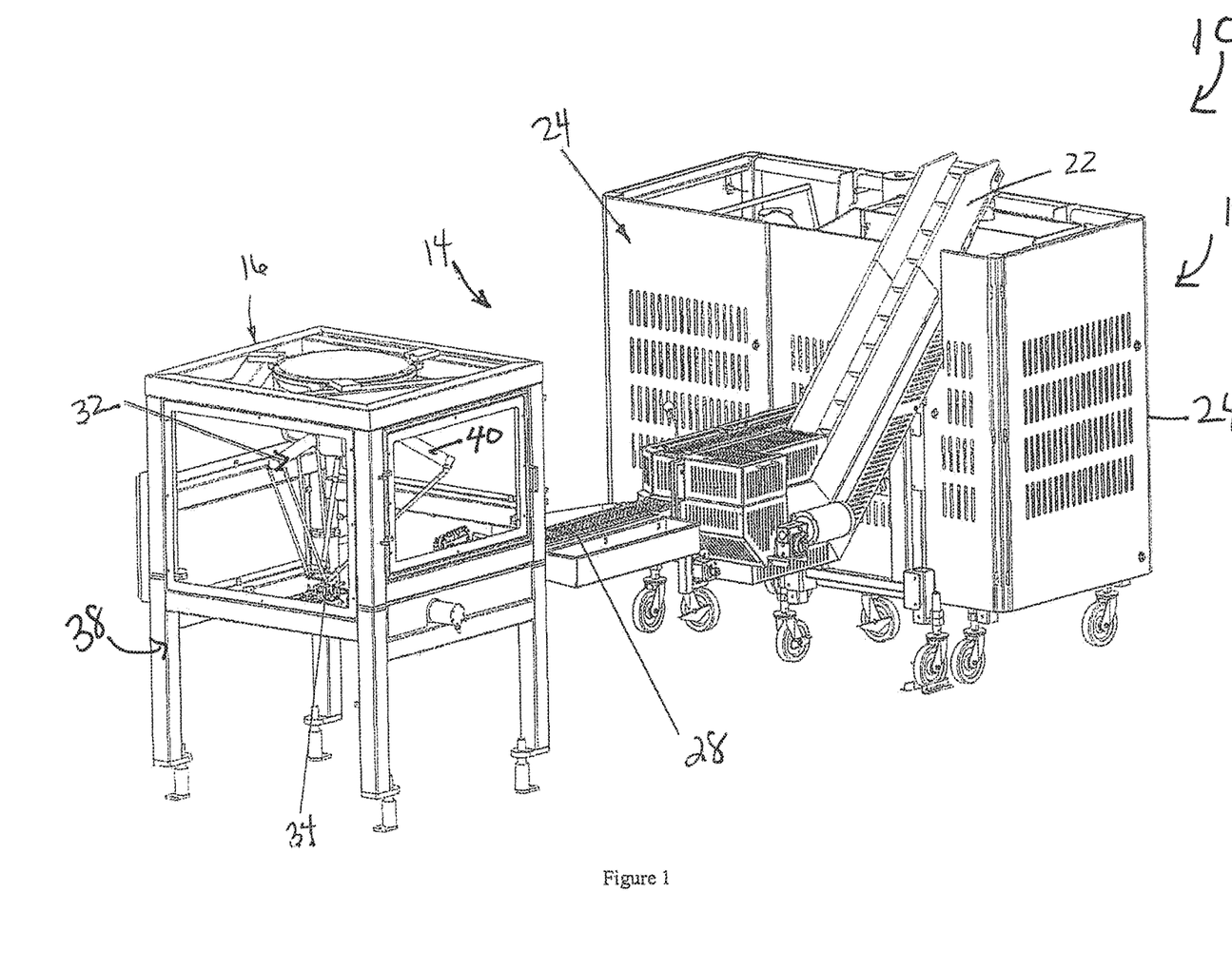
FIG. 1 is a perspective view of a food product handling system according to an exemplary embodiment of the present invention.
Figure 2:
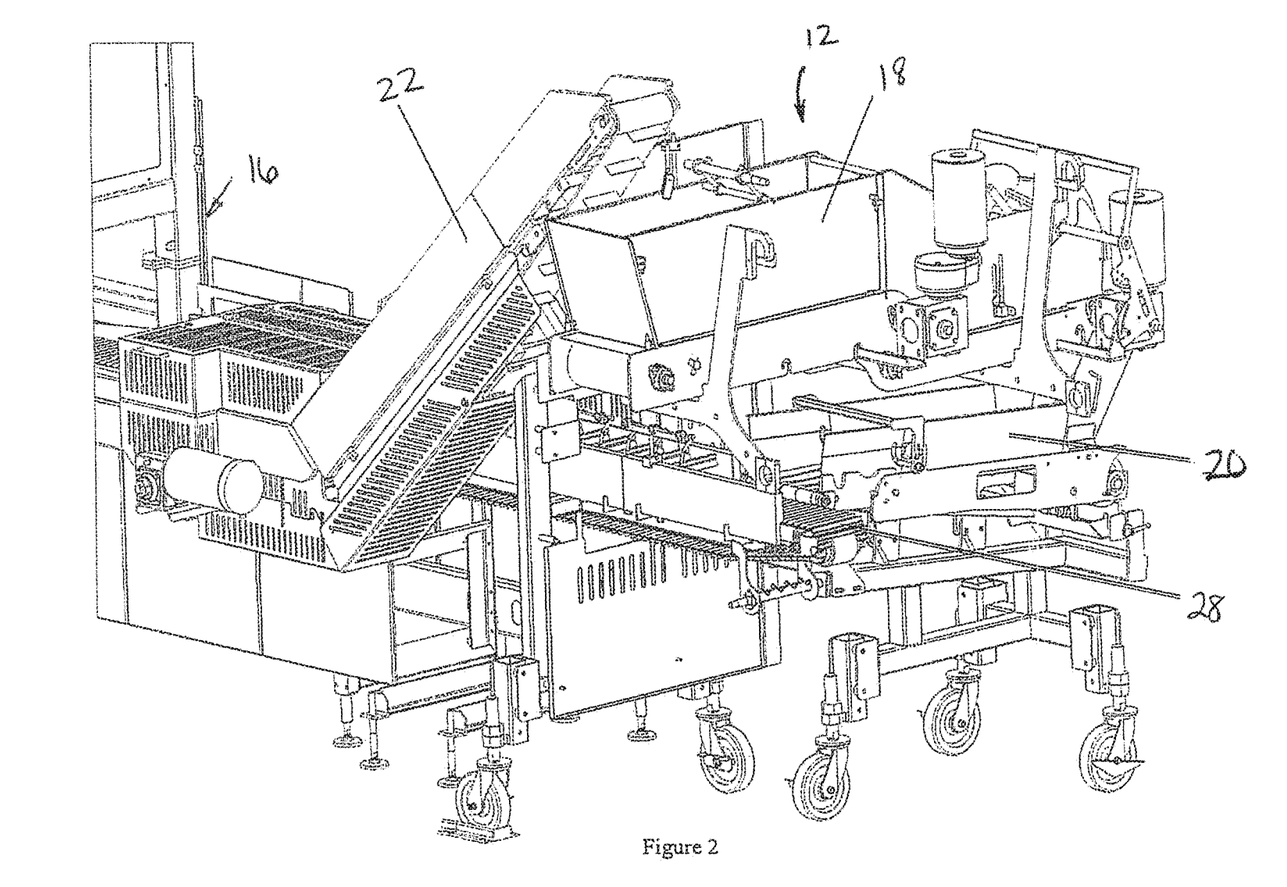
FIG. 2 is an alternative perspective view of the food product handling system of FIG. 1 according to the exemplary embodiment of the present invention.

As best illustrated in FIGS. 1 and 2, a food handling system 10 includes a product supply device 12, a conveyor system 14, and a food product loading system 16. Various types of food products can be introduced into the food handling system such as hot dogs, sausages, cheese, etc.

Figure 8:
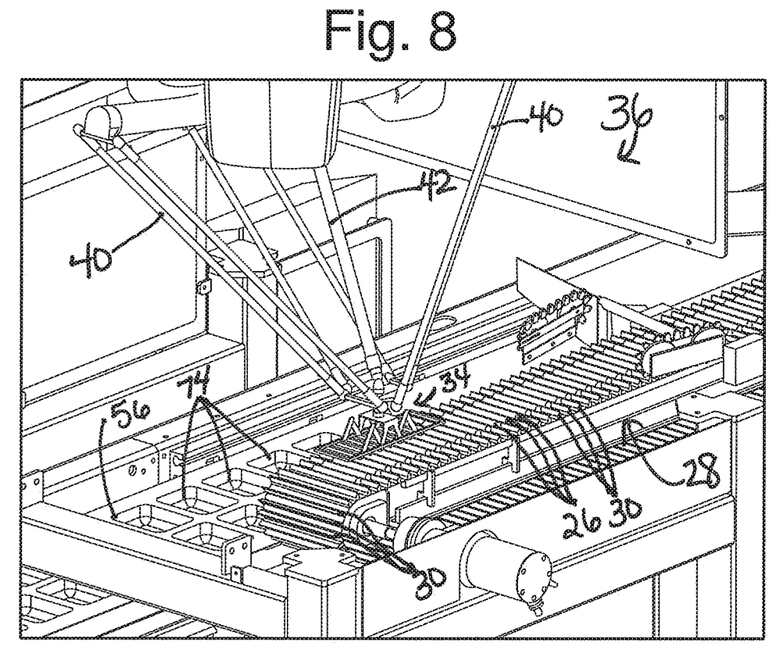
FIG. 8 is a perspective view of aligning the food product loading system with food products provided on a conveyor system according to an exemplary embodiment of the present invention.
Figure 9:
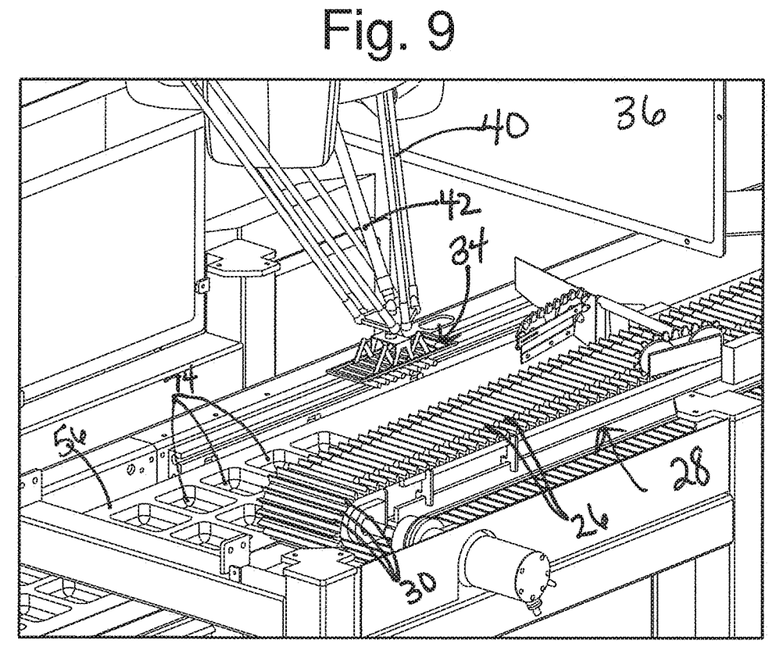
FIG. 9 is a perspective view of removing the plurality of food products from the conveyor system using the food product loading system according to an exemplary embodiment of the present invention.
Figure 10:
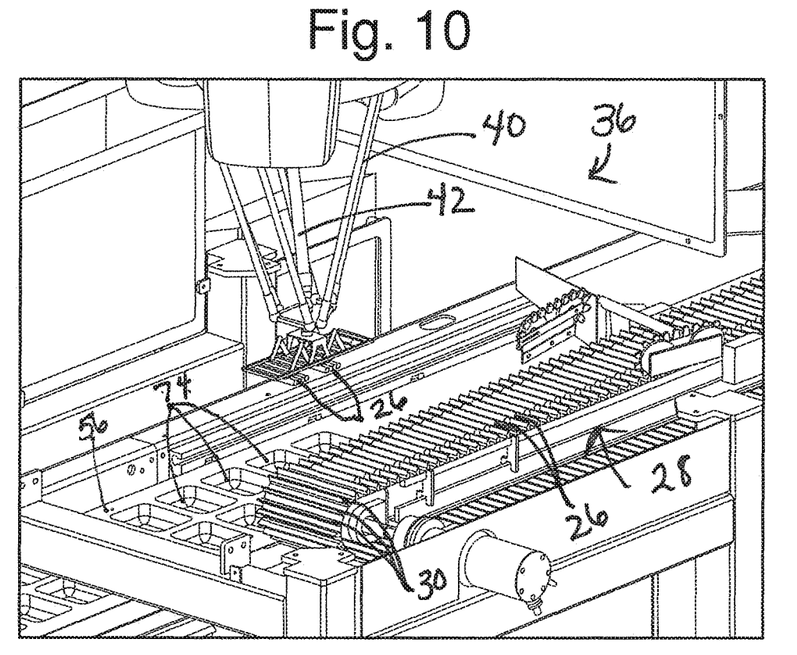
FIG. 10 is a perspective view of the plurality of food products grouped after actuating the mounting blocks of the food product loading system according to an exemplary embodiment of the present invention.
Figure 11:
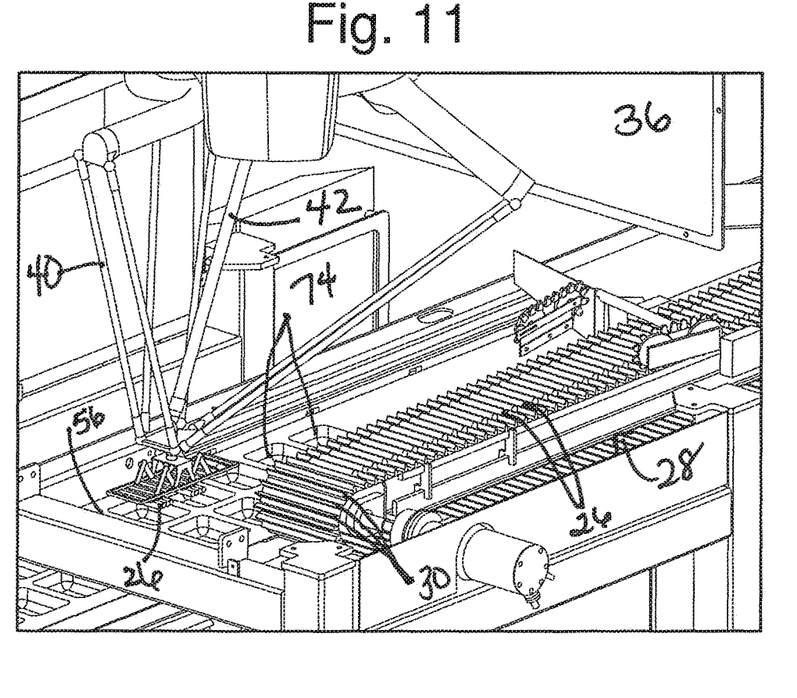
FIG. 11 is a perspective view of depositing the plurality of food products into the food product receiving device according to an exemplary embodiment of the present invention.

The product supply device 12 includes a hopper 18, an unscrambler 20, an excess conveyor 22, and guards 24. The hopper 18 is configured to hold food products 26. In an exemplary embodiment, the hopper 18 is positioned above the unscrambler 20 and below the output of excess conveyor 22. The hopper 18 can provide food products 26, as best shown in FIG. 8, to the unscrambler 20 at varying rates where the rates can be based on the type of food product currently being packaged. The unscrambler 20 is arranged to receive food products 26 from the hopper 18 and is configured to organize the food products 26 in such a manner that the food products 26 can be individually arranged onto a portion of the conveyor system 14. For example, the unscrambler 20 can unscramble the food products 26 and deliver the organized food products to a conveyor belt 28. The excess conveyor 22 transports excess food product from the conveyor belt 28 to the hopper 18 when the food products 26 do not adequately fit on the conveyor belt 28. Guards 24 are provided to protect the hopper 18 and unscrambler 20 within the product supply device 12. It is noted that FIG. 2 illustrates the product supply device 12 without guards 24 for clarity and ease of illustration.

The conveyor system 14 includes conveyor belt 28 and is configured to transport the food products 26 from the product supply device 12 to the food product loading system 16. In an exemplary embodiment, the conveyor belt 28 can include partitions 30 such that a single food product 26 can be positioned on the conveyor belt 28 between adjacent partitions 30, as best shown in FIGS. 8-11.

The food product loading system 16 includes a robotic loader 32 and a food product handling device 34. The food product loading system 16 is arranged such that the food product handling device 34 can sort, organize, and transport a plurality of food products 26 from the conveyor system 14 to the food product receiving device 36. In an exemplary embodiment, the robotic loader 32 can be suspended within a housing 38. The robotic loader 32 preferably has four axes of motion.

Figure 3:
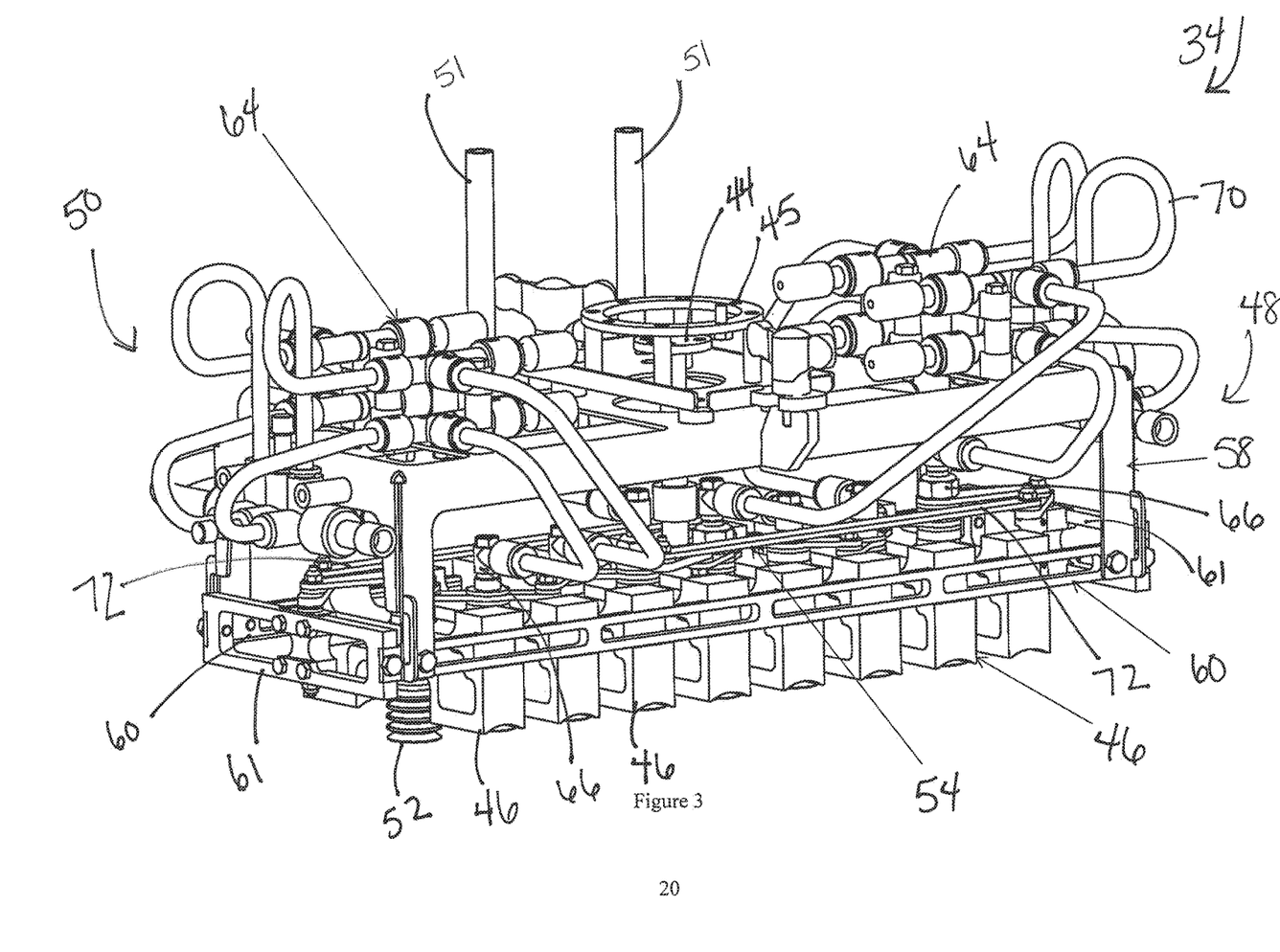
FIG. 3 is a fragmentary perspective view of a food product handling device according to an exemplary embodiment of the present invention in a first position.

The robotic loader 32 includes a plurality of arms 40 configured to position the food product handling device 34 with respect to the conveyor system 14. For example, the plurality of arms 40 of the robotic loader can translate the food product handling device 34 such that the food product handling device 34 has a degree of freedom with respect to three axes (e.g., x-axis, y-axis, and/or z-axis). In addition, the robotic loader 32 includes an arm 42 coupled to an actuation pivot 44, as best shown in FIG. 3, of the food product handling device 34 to provide an actuation force that translates the mounting blocks 46 between a first position and a second position. For example, the arm 42 of the robotic loader 32 coupled to the actuation pivot 44 can provide a torque to the actuation pivot 44 in a clockwise and/or counter-clockwise direction.

Figure 4:
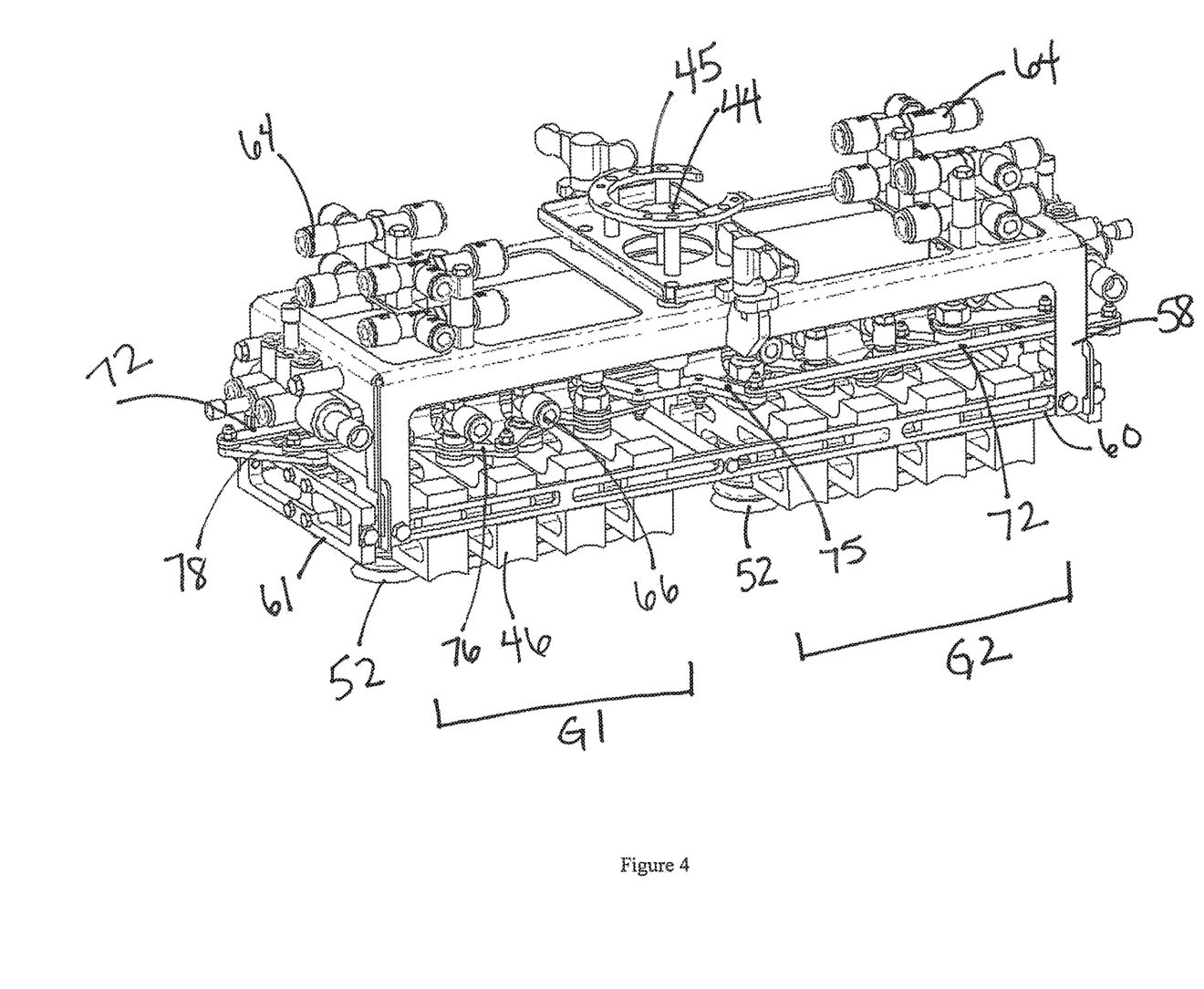
FIG. 4 is a fragmentary perspective view of the food product handling device according to an exemplary embodiment of the present invention in a second position.

As best illustrated in FIGS. 3 and 4, the food product handling device 34 includes a movable loading head 48, a vacuum system 50, a plurality of suction devices 52, a plurality of mounting blocks 46, and an actuating device 54. The food product handling device 34 is configured to remove the food products 26 from the conveyor system 14 and arrange the food products 26 into groups G1, G2 prior to placing the food products 26 in packaging material 56 associated with a food product receiving device 36, as best shown in FIGS. 8-11.

Figure 5:
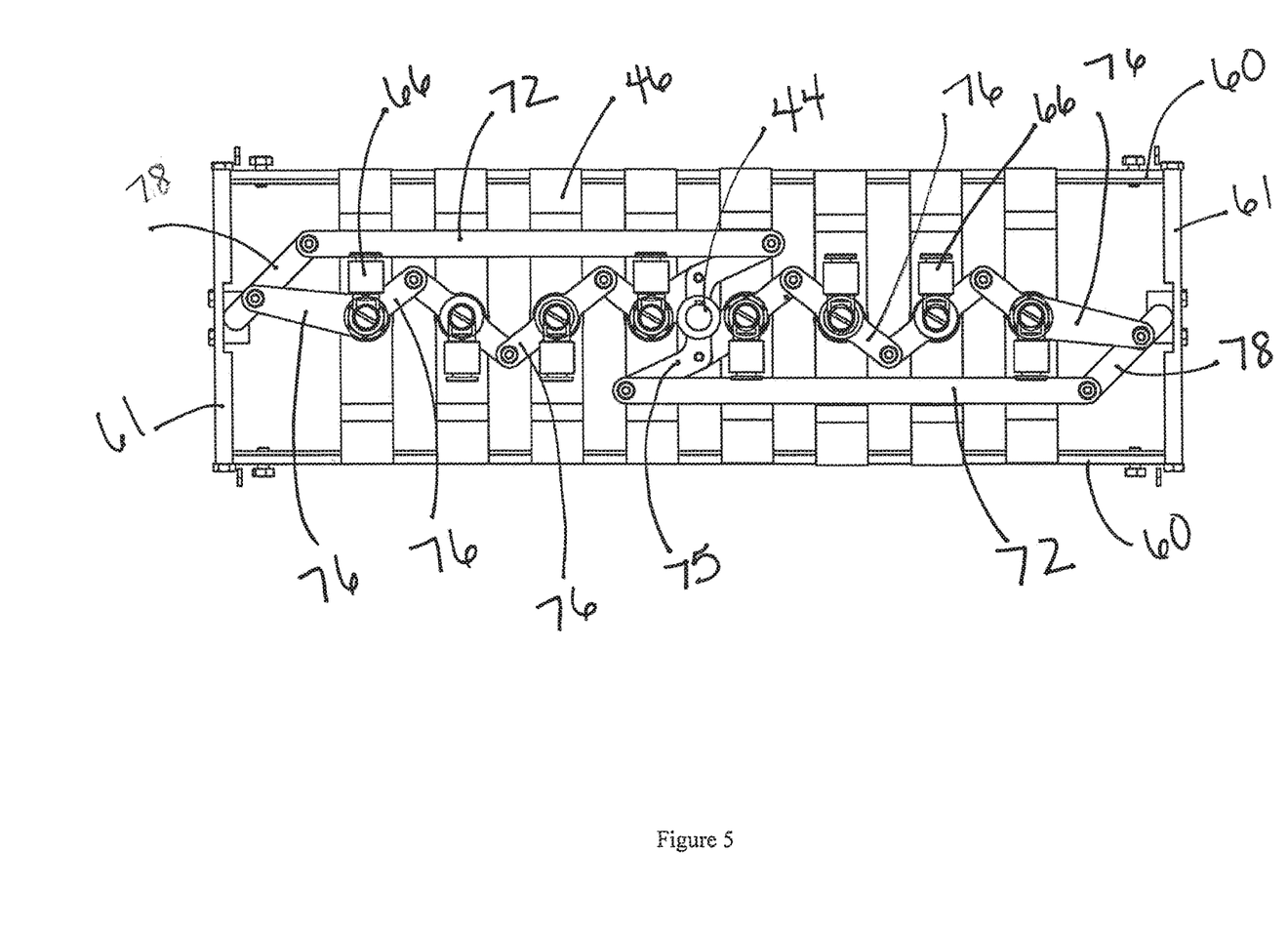
FIG. 5 is a top view of the food product handling device in the first position according to an exemplary embodiment of the present invention.
Figure 6:
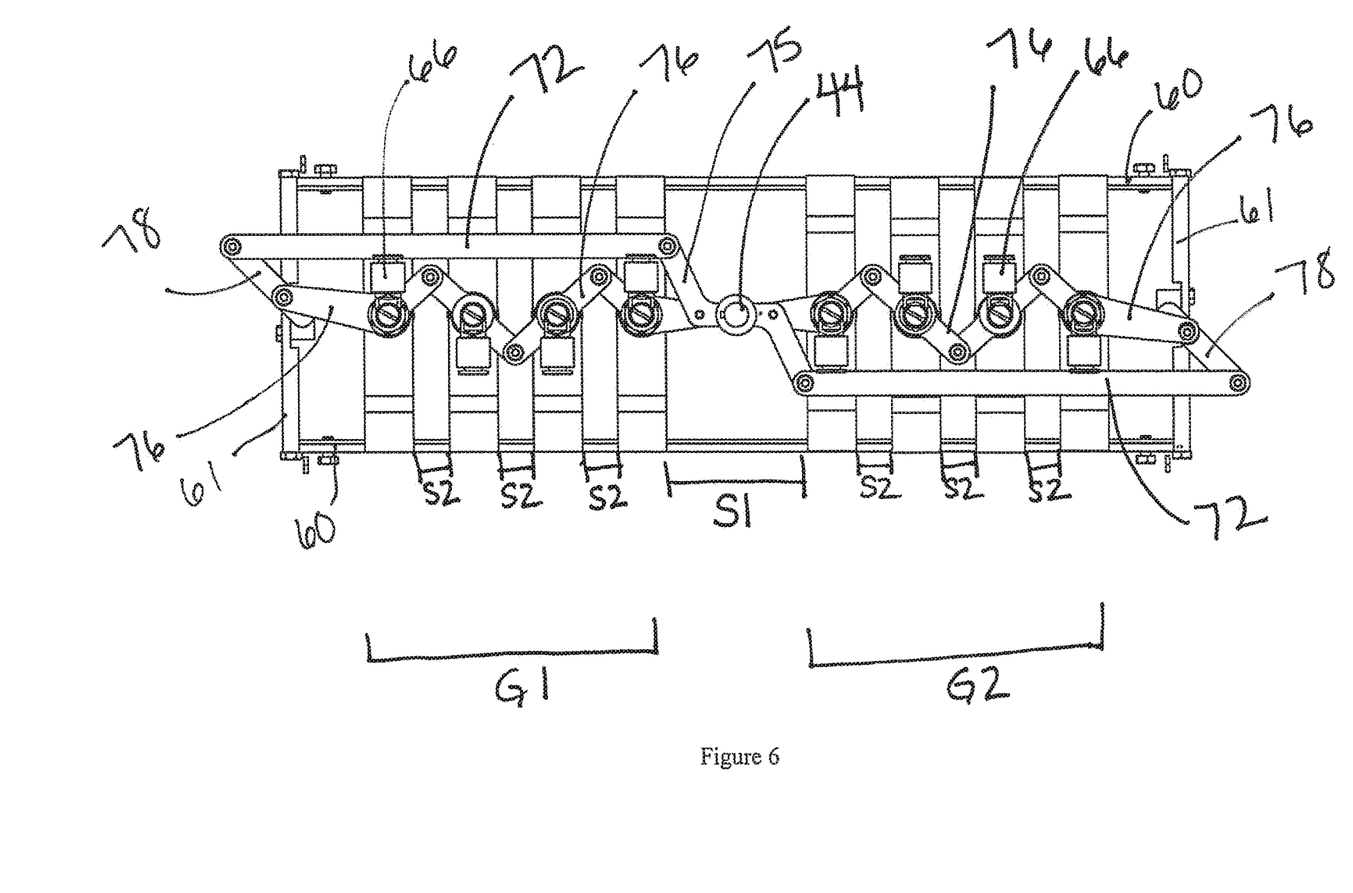
FIG. 6 is a top view of the food product handling device in the second position according to an exemplary embodiment of the present invention.
Figure 7:
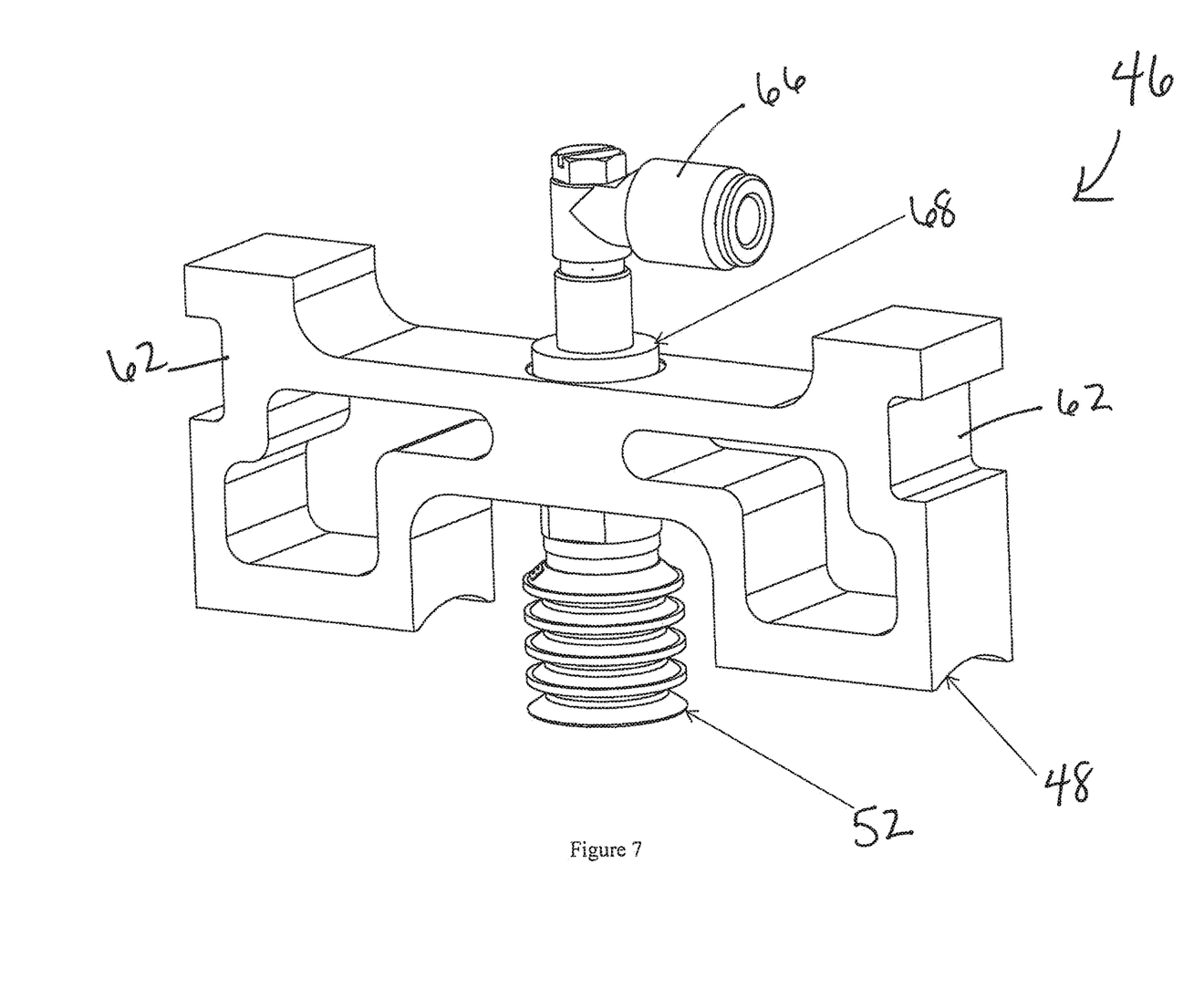
FIG. 7 is a perspective view of a mounting block of a food product handling device according to an exemplary embodiment of the present invention.

The movable loading head 48 includes a housing 58, a plurality of coupling rails 60 arranged in parallel within the housing 58, and a plurality of end connector rails 61, as best shown in FIGS. 3, 5, and 6. The mounting blocks 46 are slidably coupled to the rails 60 of the movable loading head 48. In an exemplary embodiment, as best illustrated in FIG. 7, each mounting block 46 includes a pair of grooves 62 configured to slidingly receive the plurality of rails 60. However, one of ordinary skill in the art would recognize that the plurality of mounting blocks 46 can be slidably coupled to the movable loading head 48 using any coupling technique.

At least one suction device 52 such as a suction cup can be carried by the movable loading head 48 and configured to pick up and transport one of the plurality of food products 26 from the conveyor system 14 to the food product receiving device 36. While only one suction device 52 is illustrated as being coupled to each mounting block 46, any number of suction devices 52 can be mounted on a single mounting block 46 where all suction devices 52 associated with the single mounting block 46 are in communication with one vacuum generator 64. The suction device 52 includes an elastic body, such as a bellow structure that can collapse to adapt to the size and/or shape of the corresponding food product 26. The suction device 52 may be made of a resilient material such as a silicone polymer or the like. In addition, the suction device 52 can be made out of silicone such as food grade silicone.

The vacuum system 50 includes air tubes 51, a plurality of vacuum generators 64 operatively associated with the movable loading head 48. For example, the plurality of vacuum generators 64 can be disposed on the housing 58 of the movable loading head 48. Air tubes 51 provide air to air supply valves (not shown) coupled to the vacuum generators 64. Air can be provided through air tubes 51 to control the air supply to the food product handling device 34 where each air tube 51 can be separately addressed such that food product can be disengaged from the food product handling device 34 separately. For instance, after the food product handling device 34 is actuated from the first position to the second position, each group of food products can be separately disengaged from the food product handing device 34. The number of vacuum generators 64 is directly related to the number of mounting blocks where one vacuum generator 64 is coupled to each vacuum generator port 66. Each suction device 52 is coupled to a vacuum generator port 66 via a post 68 and a connector 70, such as a venturi tube. In an exemplary embodiment, the vacuum generators 64 can be operated in the range of approximately 30 to 87 kPa where the vacuum generators 64 create a vacuum in the range of approximately 10 to 60 psi at each corresponding suction device 52. The amount of vacuum generated at the suction device 52 is based on the type, size, and shape of the food product.

As best illustrated in FIG. 6, the actuation device 54 can include an actuating pivot 44, an actuating arm support structure 45, and at least one actuating arm 72 coupled to the actuating pivot 44. The actuating pivot 44 is disposed on the movable loading head 48 and is configured to receive a force from the actuation arm 42 of the robot loader 32. When a clockwise and/or counter-clockwise torque is applied to the actuating pivot 44, the at least one actuating arm 72 provides an actuation of at least two mounting blocks 46 between a first position and a second position and can be supported by the actuating arm support structure 45. For example, as best illustrated in FIGS. 3 and 5, the plurality of mounting blocks 46 can be substantially equally spaced within the housing 58 of the movable loading head 48 when in the first position and, as best illustrated in FIGS. 4 and 6, the plurality of mounting blocks 48 can be articulated to form groups G1, G2 where a spacing S1 between the first group and a second group is greater than a spacing S2 between mounting blocks within each group G1, G2. When the plurality of mounting blocks 46 are arranged in groups G1, G2, the groups G1, G2 are associated with pockets 74 formed in the packaging material 56 of the food product receiving device 36 such that each group G1, G2 is aligned with one pocket 74, as best shown in FIGS. 8-11. While the mounting blocks 46 of food product handling device 34 are illustrated as being articulated into two groups G1, G2, one of ordinary skill in the art would recognize that any number of groups can be formed based on the number of articulating arms 72 and mounting blocks 46 provided that each group includes at least two mounting blocks 46.

In an exemplary embodiment, the actuation device 54 can further include actuation pivot connector 75, intermediary actuation connectors 76, and mounted actuation connectors 78. The actuation pivot connector 75 is directly coupled to the actuation pivot 44. The proximal ends of the actuation arms 72 are coupled to the actuation pivot connector 75. The intermediary actuation connectors 76 are coupled to the mounting blocks 46 and the mounted actuation connectors 78 are coupled between the actuation arm 72 and the end connector rail 61. In addition, the intermediary actuation connector 76 associated with the mounting block closest to the end connector rail 61 is further coupled to the mounted actuation connector 78. Each mounted actuation connector 78 can be mounted onto the corresponding end connector rail 61 such that the mounted actuation connector 78 is located substantially equal between the connector rails 60. As best shown in FIGS. 3, 5, and 6, the intermediary actuation connectors 76 are coupled to the mounting blocks 46 via the post 68 associated with each vacuum generator port 66 and adjacent intermediary actuation connectors 76 are coupled together. When an actuation force is applied to the actuation pivot, each actuation arm 72 translates with respect to the actuation pivot 44 and the mounted actuation connector 61 such that both actuation arms 72 remain substantially parallel with respect to each other during actuation between the first position and the second position.

In operation, food products 26 are loaded into the hopper 18 of the food product supply device 12. The hopper 18 provides the food products 26 to the unscrambler 20 at a predetermined rate. The unscrambler 20 unscrambles the food products 26 provided by the hopper 18 and organizes the food products 26 such that the food products 26 are individually arranged on the conveyor system 14. The food products 26 are substantially equally spaced on the conveyor belt 28 of the conveyor system 14. As the food products 26 travel from the product supply device 12 to the food product loading system 16, the robotic loader 32 aligns the food product handling device 34 above the food products 26. The robotic loader 32 than lowers the food product handling device 34 such that the suction devices 52 contact the food products 26. A vacuum is applied to each suction device 52 of the food product handling device 34 using vacuum generators 64 thereby engaging a single food product 26 with each suction device 52 using a suction force. As best illustrated in FIGS. 3 and 5, the mounting blocks 46 of the food product handling device 34 are arranged such that they are substantially equally spaced in a first position when the food products 26 are first engaged with the suction devices 52.

The mounting blocks 46 are then actuated to a second position using the actuating device 54 of the food product handling device 34. In an exemplary embodiment, an actuation force is applied by arm 42 of the robot loader 32 to the actuation pivot 44 of the actuating device 54. As best illustrated in FIGS. 5 and 6, the actuation pivot 44 is coupled with actuation arms 72 where a first end of each actuation arm 72 is coupled to the actuation pivot 44 and a second end of each actuation arm 72 is coupled to an intermediary actuation connector 76. In addition, at least one intermediary actuation connector 76 is coupled with a mounting block 48 of the food product handling device 34 such that the mounting blocks 48 are slidably actuated into groups G1, G2 based on the actuation force applied to the actuation pivot 44 and translated through the actuation arms 72 and the intermediary actuation connectors 76.

The robotic loader 32 then translates the food product handling device 34 from a first position associated with the conveyor system 14 to a second position associated with the food product receiving device 36. It is noted that the mounting blocks 48 can be slidably actuated before, after, or while the robotic loader 32 translates the food product handling device 34 from the conveyor system 14 to the food product receiving device 36. When the robotic loader 32 reaches the second position, the groups G1, G2 of the food products 26 are aligned with the pockets 74 formed in the packaging material 56 of the food product receiving device 36. The robotic loader 32 can align the groups G1, G2 in a vertical or horizontal direction such that the groups G1, G2 of food product 26 are deposited into adjacent pockets 74 when the vacuum generators 64 cease applying a suction pressure to the suction devices 52. Those skilled in the art would recognize that the pockets 74 are typically formed from a transparent, flexible polymer material known in the food industry.

After the food products 26 are deposited into the pockets 74 of the packaging material 56, the robotic loader 32 can provide an actuation force to the actuation pivot 44 such that the mounting blocks 46 return to the first position having a substantially equal space between adjacent mounting blocks 46. In addition, the robotic loader 32 can return the food product handling device 34 to a location associated with the conveyor system 14 and the above described steps can be repeated. When the robotic loader 32 subsequently returns to the position associated with the food product receiving device 36, the robotic loader 32 can align the groups G1, G2 of food product 26 with the same or different pocket 74 in which the preceding groups of food products 26 were deposited.

It should be understood that various changes and modifications to the presently disclosed embodiment as described herein will be apparent to those skilled in the art. Such changes and modifications may be made without departing from the spirit and scope of the present application and without diminishing its intended advantages.

The invention claimed is:

1. A method of handling food product comprising the steps of:
   providing a plurality of food products:
   aligning a food product handling device above the plurality of food products, wherein the food product handling device comprises
   a movable loading head having a plurality of rails,
   a vacuum system operatively associated with the head,
   a plurality of suction devices carried by the head and configured to pick up and transport food products as the head is moved, wherein each suction device is coupled to the vacuum system,
   a plurality of mounting blocks slidably coupled to the rails, wherein one suction device is coupled to one mounting block, and
   an actuating device, operatively associated with the mounting blocks such that each mounting block is configured to slide in first and second groups between respective first and second positions, wherein, when the mounting blocks are in the second position, a distance between respective mounting blocks at opposed adjacent ends of the first group and the second group is greater than a distance between adjacent mounting blocks when in the first position, and spacing between adjacent mounting blocks within the respective first and second groups is smaller than the distance between adjacent mounting blocks when in the first position;
   applying a vacuum to each suction device of the food product handling device and thereby engaging a food product with each suction device when the mounting blocks are in the first position;
   actuating the mounting blocks to the second position using the actuating device; and,
   depositing the food products into packaging material by ceasing application of the vacuum at each suction device.

2. The method of claim 1, wherein the actuating device further includes a fluid manifold operatively associated with the actuating cylinder and the vacuum system.

3. The method of claim 1, wherein the vacuum system comprises a plurality of vacuum generators disposed on the movable loading head, and one or more vacuum generator ports coupled to each of the mounting blocks.

4. The method of claim 3, wherein each of the vacuum generators is operatively coupled with one suction device.

5. The method of claim 4, wherein a venturi tube is interposed between each of the vacuum generators and each of the vacuum generator ports.

6. The method of claim 1, wherein each of the suction devices comprises an elastic body.

7. The method of claim 6, wherein each elastic body comprises a bellows structure.

8. The method as in claim 1, wherein said packaging material comprises two separate openings to receive respective groupings of food product from the first and second groups of mounting blocks.

9. The method of claim 8, wherein the vacuum system comprises a plurality of vacuum generators disposed on the movable loading head, and one or more vacuum generator ports coupled to each of the mounting blocks.

10. The method of claim 9, wherein each of the vacuum generators is operatively coupled with one suction device.

11. The method of claim 10, wherein a venturi tube is interposed between each of the vacuum generators and each of the vacuum generator ports.

12. The method of claim 8, wherein each of the suction devices comprises an elastic body.

13. The method of claim 12, wherein each elastic body comprises a bellows structure.

* * * * *